Aug. 3, 1943.  J. BAZELL  2,325,651

FILM SPLICING MACHINE

Filed May 4, 1938  3 Sheets-Sheet 1

INVENTOR.
Jacob Bazell
BY Hastings W. Baker
ATTORNEY

Aug. 3, 1943.   J. BAZELL   2,325,651
FILM SPLICING MACHINE
Filed May 4, 1938   3 Sheets-Sheet 2

INVENTOR.
Jacob Bazell
BY Hastings W. Baker
ATTORNEY

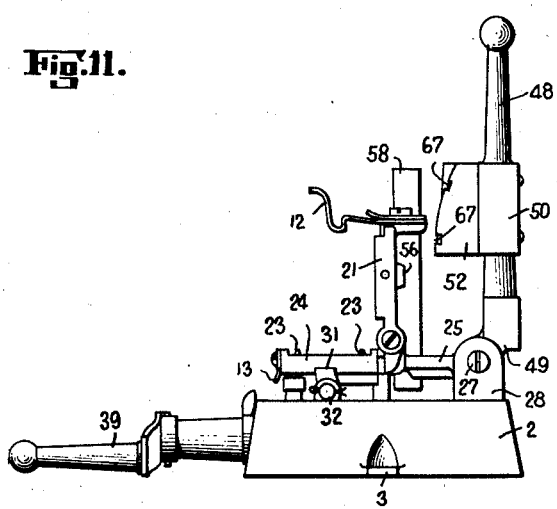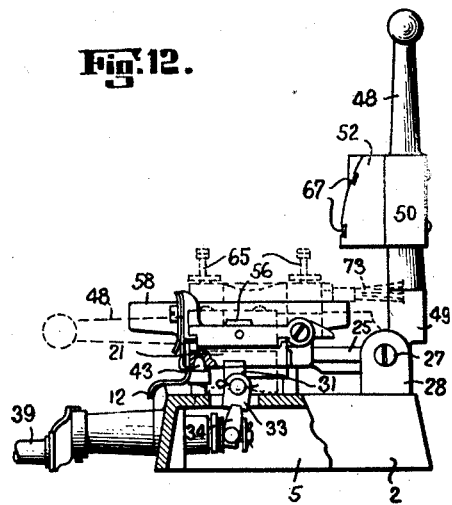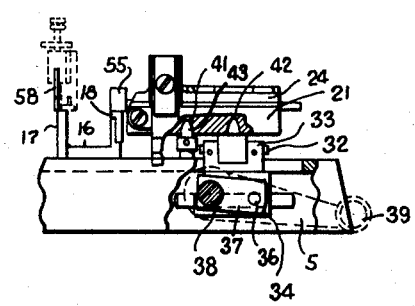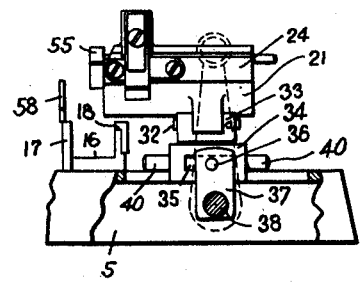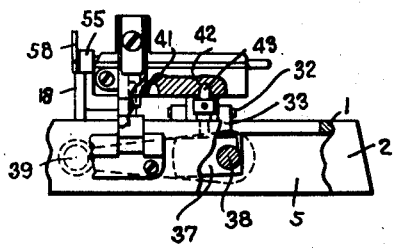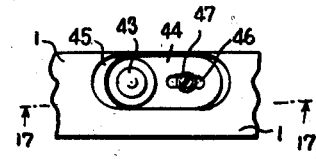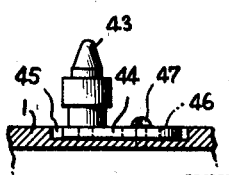

Patented Aug. 3, 1943

2,325,651

UNITED STATES PATENT OFFICE 2,325,651

FILM SPLICING MACHINE

Jacob Bazell, Stapleton, Staten Island, N. Y., assignor to International Projector Corporation, New York, N. Y., a corporation of Delaware Application May 4, 1938, Serial No. 205,895

13 Claims. (Cl. 154—42)

This invention relates to the improvements in film splicing machines.

The pictures on motion picture films are divided into frames, each of which has a length equal to four sprocket holes or perforations. Of course, any number of sprocket holes might be employed for each frame. When the film is placed in a projector which is intermittently fed by an intermittently operated sprocket which has teeth thereon, it projects through the said sprocket holes thereby quickly advancing the film while the light is cut off by means of a shutter. The intermittent sprocket is then held stationary while the light passes through the film onto the screen. Sometimes this film breaks and it is necessary to repair the same. It is essential in making this repair that a length of the film around the break shall be cut out and the two ends brought together and spliced, but in making this repair, it is essential that the film should be shortened by a length precisely equal to one or more frames. If, for instance, there are four sprocket holes to one frame and the film was shortened by a length equal to three sprocket holes or five or any number of sprocket holes other than precisely four, and thereafter projection of this incorrectly spliced film was attempted, the screen effect would result in the bottom of one frame and the top of the next appearing simultaneously. One of the objects of this invention is to provide means to positively eliminate such an occurrence.

Even if a length of film equal to four sprocket holes were severed, but if the sprocket holes were not exactly matched nor exactly spaced on each side of the point of repair, the sprocket holes would no longer be in the correct position to receive the teeth of the sprocket which would cause the mutilation of the film and would also require reframing of the picture. With my improved device the operator quickly cuts out the mutilated portion and makes the repair without the necessity of making calculations so that the repaired film is shortened by an amount exactly corresponding to the length of one frame.

Another object of the invention is to provide an improved method of scraping the film emulsion from the end of one section of the film after it has been cut and with my improved construction I have provided a guide means for a scraper consisting of a file so as to correctly position the scraper and to scrape the emulsion from the film so as to leave a clear-cut line separating the scraped part from the unscraped part.

Another object of the invention is in regard to the sound track. If there is even a minute portion of the sound track scraped so as to emit light therethrough and not subsequently covered up, it will create a discordant noise. With my improved construction this positively is eliminated by scraping exactly the amount necessary to be removed and by cutting the other end of the film so that there is a small projection that will overlie the sound track as a precautionary measure so that if by any chance the sound track was scraped, even a thousandth of an inch beyond what it should have been scraped, this little tab on the end of the other piece of film would be brought into position to overlie the scraped portion of the sound track and thereby blot out any light which might otherwise pass therethrough, thereby positively eliminating any discordant noise.

In splicing a negative film the amount which should be scraped is much less than when a positive film is employed. I have provided adjustable means to accommodate either a positive or a negative film so as to adjust the amount that would be scraped.

In film splicing machines heretofore employed it has generally been necessary to provide what is known as a blooping patch, which is a patch which is placed over the repaired part and extending diagonally from one edge of the film at about the end of one frame diagonally across the said frame to the opposite side of the film at the point where it is patched and thence diagonally across to the first side on the next frame adjacent the splice. I have found that with the perfection attained with my improved splicing mechanism the blooping patch might be eliminated.

Another object of the invention is to provide positive cam actuating means to move one end of the film after it has been cut into exact position with the other end of the film and to make the splice, the said movement of the film and the pressing of the end of the film thus moved into engagement with the other end of the film being all in one operation. It is essential that after the cement is applied to the scraped portion of the film that the other end of the film should be brought into contact therewith and pressed in tight engagement therewith at the earliest possible moment for if there is a delay, the said cement which dries very quickly might make an imperfect union.

Another object of the invention is to provide an automatic centering means to center the movable carrier so as to position the end of the film into exact position with regard to the other end of the film.

Other objects and advantages of the invention will appear in the detailed specification and claims which follow.

Fig. 11 is an end elevational view of Fig. 1 looking from the right of said figure.

Fig. 12 is similar but with the lids closed and a portion of the base being broken away to show the internal structure.

Fig. 13 is a view taken at right angles to Fig. 12 and showing the position of the movable bed when the knife has been operated and with the scraper in position.

Fig. 14 is a view similar to Fig. 13 but showing the scraper removed and with the movable bed having been moved one-half of its distance to the left as viewed in the said figure.

Fig. 15 is a view similar to Fig. 14 but showing the movable bed at the completion of its movement towards the anvil.

Fig. 16 is a plan view for adjusting means for the cam positioning means.

Fig. 17 is a side view thereof on the line 17—17 of Fig. 16.

Figure 1:
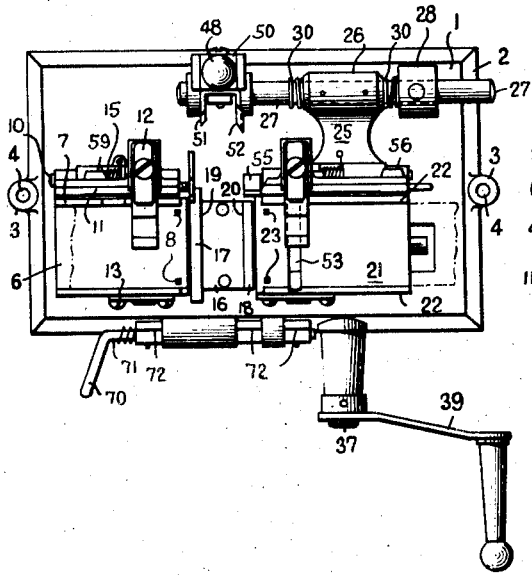
Fig. 1 is a plan view showing the clamping lids in open position.

A base is provided consisting of a base plate 1 with four side plates 2 extending downwardly therefrom. If desired, certain of the side plates can be provided with outstanding lugs 3 provided with holes adapted to receive screws 4 so that the same may be secured to any support. Beneath the base plate 1 and within the said plates 2 is a chamber 5 which receives the crank operating mechanism and the heads of bolts by which the mechanism mounted on the base plate 1 may be secured thereto.

Figure 2:
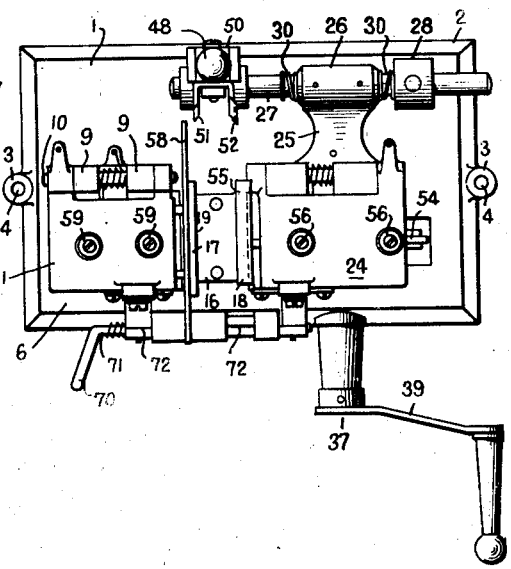
Fig. 2 is a similar view showing the clamping lids in closed position.
Figure 4:
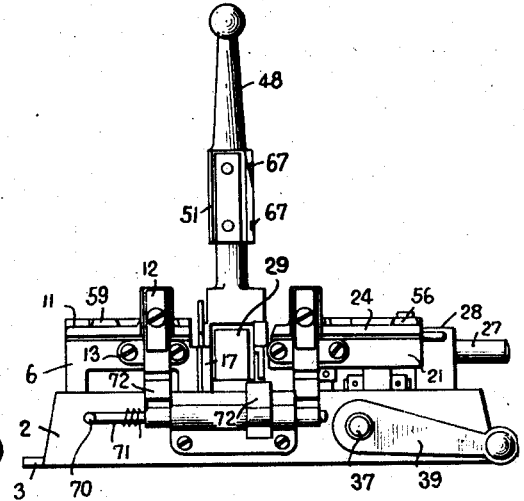
Fig. 4 is a front elevational view similar to Fig. 2.

A fixed bed 6 is secured to the base plate 1 and is provided with upstanding guide plates 7 so that a film might be positioned between the said guide plates and so that pins 8 extending upwardly from the bed would be in position to project through the sprocket holes of the film. The fixed bed 6 has lugs 9 projecting from the rear thereof, which lugs are provided with holes which receive a spindle 10 on which is mounted a lid 11. It might be more briefly stated that the lid 11 is hinged to the fixed bed. The lid 11 is provided with a catch 12 at the front thereof which engages a catch 13 on the fixed bed plate when the lid is in its closed position as shown in Figs. 2 and 4. The lid 11 is provided with holes 14 so that when the lid is closed, the pins 8 will project into the said holes 14. A spring 15 is coiled around the spindle 10, tending to retain the lid in its open position or so that when the catch 12 is released from the catch 13 the said spring 15 will move the lid into its open position.

A U-shaped anvil and stationary cutter 16 is attached to the base plate 1, which anvil is provided with two upstanding sides terminating in a stationary scraper and presser plate 17 and a plate 18 forms the opposite leg thereof. The top and side walls of the plates 17 and 18 provide cutting edges 19 and 20, and the top of the plates 17 and 18 are in alignment with the bed 6 so that the film will not have to make any bend in passing over the bed 6 and the plates 17 and 18, and they extend to the same elevation as the movable bed 21 when the same is in its depressed position as will be hereinafter described.

The movable bed 21 is provided with guides 22 which form a continuation of the guides 7 on the fixed bed. The movable bed 21 is also provided with pins 23, similar to the pins 8 on the fixed bed. It is likewise provided with a lid 24 which is hinged to the same precisely as the lid 11 is hinged to the fixed bed 6. The movable bed 21 is integral or secured to a strap 25 which at its rearward end is provided with a boss 26 through which projects a spindle 27 mounted in brackets 28 and 29 respectively upstanding from the base plate 1. Buffer springs 30 are positioned on each side of the boss 26 and between the same and the brackets 28 and 29.

The boss 26 is slidable on the spindle 27 so as to move the movable bed 21 toward or away from the presser plate 17. The means for moving it consists of a depending lug 31 provided with a hole through which passes a shaft 32 which extends through lugs 33 upstanding from a shiftable bar 34 which is provided with a slot 35 into which projects a crank pin 36 on a crank arm 37 which is secured to a crank shaft 38 through which is attached a manually operated crank 39. Spring controlled shock absorbing pins 40 are carried by the shiftable bar 34 and project into the slot 35 so as to absorb any shock imparted by the crank pin 36.

The under side of the movable bed 21 is provided with two centering holes 41 and 42 respectively, each of which are provided with cam sides so as to receive a cam pin 43 projecting upwardly from the base plate 1 when the parts are in the position shown in Fig. 13. The pin 43 extends within the centering hole 41 and the film should now be positioned on the movable bed, the crank handle being in the position shown in dotted lines in Fig. 13. When, however, the crank handle 39 is rotated anti-clockwise the movable bed is moved upwardly by means of the crank pin 36 so that the centering hole 41 is removed from the pin 43 and as the manual crank 39 continues its movement in an anti-clockwise direction into the position shown in Fig. 15, which is the finished position, the pin 43 will project into the centering hole 42. The object of this movement of the movable bed is to move the film after it has been cut, as will hereinafter be described, the exact distance required as set forth in the objects of the invention and the cam shaped pin with its corresponding cam shaped centering holes is an essential feature of the correct positioning of the movable bed before it is moved and after it is moved.

If after long use the parts became somewhat worn, it might be necessary to adjust to a minute degree the position of the pin 43. This might be done in a number of different ways. In Fig. 13 I have shown the pin 43 as offset to a minute degree with the center of its shaft so that by rotating the said shaft on which the pin is mounted we would move it closer or further away from the end of the movable plate, which is in effect moving it closer to or further away from the plate 17. Another way that this result might be accomplished is by attaching the pin 43 to a movable plate 44 in a shallow slot 45 in the base plate 1 and providing a slot 46 in the movable plate 44. A set pin 47 may be screwed through the said slot into the base plate 1. This modification is shown in Figs. 16 and 17.

Figure 8:
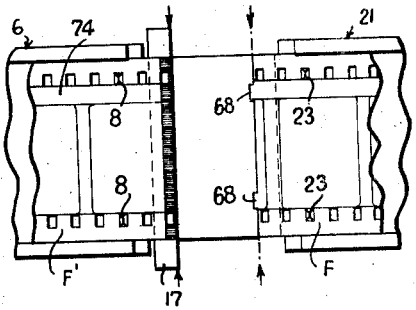
Fig. 8 is a view similar to Fig. 7 but with a broken part of the film cut out and one end of the film scraped.

The severing means consists of a knife mounted on a lever. This lever 48 is provided with bifurcated arms 49 which receive the spindle 27. The lever intermediate its end is provided with a square portion 50 on which is mounted two cutting knives 51 and 52 respectively, the knife 51 cooperating with the edge 19 and the plate 17 and the knife 52 cooperating with the edge 20 and the plate 18. As shown in Figs. 11 and 12, the knife 52 is provided with two slots 67 which will cut tabs 68 on the film F which tabs are best shown in Fig. 8. One of these tabs is adjacent the sound track and the function of the same will be hereinafter described. These two knives and the two cutting edges 19 and 20 are so spaced apart that exactly the correct amount of film is cut out. It is desirable that the lever 48 should at all times be so positioned that when depressed to cut, the knife 51 will be brought into exact contact with the edge 19. This result may be obtained by making the bracket 29 a stop for the lever 48 and in providing any means such as a spring, not shown, to push the lever to the left as viewed in Fig. 1 so that the the right-hand arm 49 will be in engagement with the bracket 29.

When the bed is shifted from the position shown in Fig. 13 to that shown in Fig. 15, it is necessary for the plate 18 to extend upwardly through the movable bed 21, and I have provided a slot 53 as shown in Fig. 1 to receive the said plate 18 when the bed is shifted to the position shown in Fig. 15.

The movable bed 21 is provided with a bore extending from the right to the left thereof and in this bore is positioned a spindle 54 which carries a presser bar 55. The spindle 54 may be adjusted by releasing set screws 56 which extend through the lid 24 and engage in spindle. After the set screws are released, the spindle may be shifted to the right or to the left so as to set the presser bar 55 in its adjusted portion and the set screws then reset.

The lid 11 of the fixed bed is also provided with a bore through which passes a shaft 57 on which is mounted a guide bar 58 for a scraper and so positioned as to adjust this scraper directly over the presser plate 17.

In order to make a narrow scraped surface, the set screws 59 would be released and the shaft 57 moved slightly to the right as viewed in Figs. 1 to 4 inclusive and the said screws then reset. This would bring the guide bar 58 nearer to the cutting edge 19. In order to make a wider scraping surface on positive film, we would release the said screws and move the guide bar 58 to the left as viewed in Figs. 1 to 4 so as to remove it further away from the cutting edge 19 and thereby make a wider scraping surface.

Figure 5:
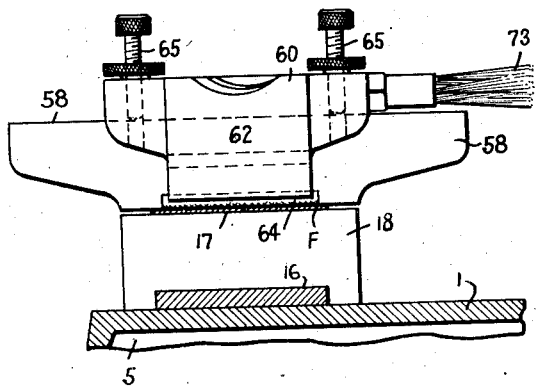
Fig. 5 is a side elevational view of the scraper and brush on the guide mechanism therefor.
Figure 6:
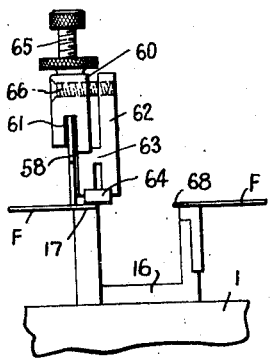
Fig. 6 is a view taken at right angles to Fig. 5.

The scraper bar 60 is best shown in Figs. 5 and 6. This scraper bar is provided with a slot 61 which receives the upper end of the guide bar 58. It is integral with a plate 62 being connected therewith by a neck 63. At the lower end it is provided with a file member 64 having filing teeth on the lower portion where it would contact the film resting on the presser plate. Adjusting screws 65 extend upwardly through the scraper bar and downwardly through the same as shown in Fig. 5 so that by adjusting the said screws the lower end of the screws may be brought into engagement with the upper end of the presser bar so as to accommodate films of different thicknesses, also to compensate for wear. The further the said screws are screwed downwardly, the higher it would raise the scraper bar. Screws 66 extend laterally through the plate 62 so that the upper end of the plate 62 may be brought nearer to or further from the scraper bar 60 so that the file member 64 may be tightened or loosened and removed.

Figure 3:
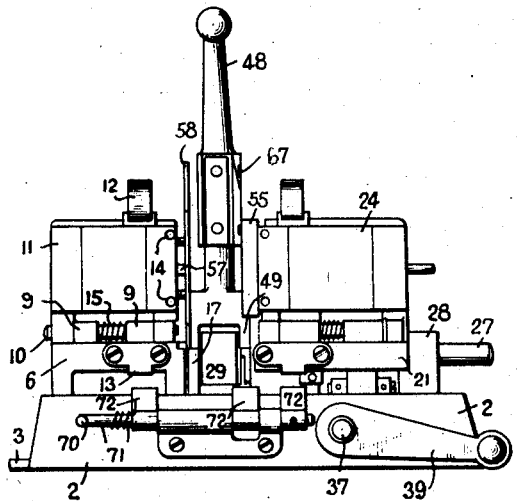
Fig. 3 is a front elevational view similar to Fig. 1.
Figure 7:
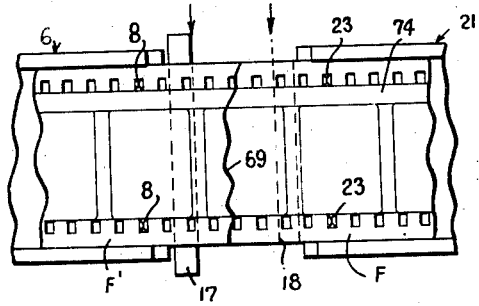
Fig. 7 is a plan view of the fixed and movable beds with a broken film mounted thereon.
Figure 9:
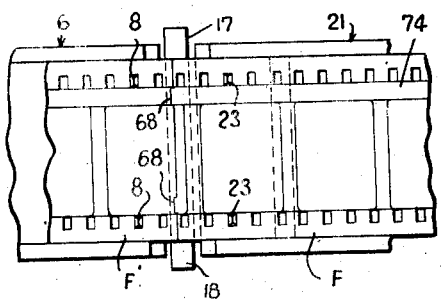
Fig. 9 is a similar view but showing the movable bed in the portion after it has been moved so as to bring the ends of the film together.
Figure 10:
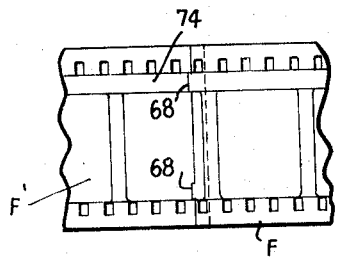
Fig. 10 is a plan view of the film after it has been repaired.

The operation of splicing film might be briefly summarized as follows. We will assume that the film has been broken or ruptured as indicated by the line 69 in Fig. 7, and for purposes of description we will assume that one part of the film is denoted by the reference character F and the other part by the reference character F'. It is desired to cut out one frame and to mend the film so that after it is mended the film will be shortened by a distance equal to exactly one frame which in modern film is equal to four sprocket teeth. Obviously, any number of sprocket teeth might be employed, however, for each frame. Since there will be a slight overlap when the film is mended, the distance between the cutting edges 19 and 20 should therefore be slightly less than the length of film occupied in one frame, or to be more exact, the amount to be cut out between knives plus the amount of overlap should be precisely equal to one frame. In order to accomplish this purpose, the lids 11 and 24 are opened by pressing downwardly on the lever 70 on the shaft 71 which moves the three levers 72 carried by the said shaft outwardly thereby engaging the catches 12 on the lids and releasing the said catches from the catches 13 whereupon the springs 15 move the said lids to their open position as shown in Figs. 1 and 3. The lever 39 should be in the position shown in Figs. 1 to 4 inclusive so that the movable bed 21 is entirely to the right of the plate 18 as shown in Figs. 1 to 4 inclusive as well as Fig. 7. The film F' should now be inserted so that the pins 8 will project through the sprocket holes of the film. It is immaterial as to what sprocket holes receive the pins so long as the ruptured line 69 is positioned between the cutting edges 19 and 20. The other section F of the film should be placed on the movable bed 21 so that its ruptured edge will abut against the ruptured edge of the film F' forming the line 69. The pins 23 on the movable bed would likewise project through the sprocket holes. The lids 11 and 24 should now be closed or moved into the position shown in Figs. 2 and 4. This leaves the mutilated portion of the film between the cutting edges 19 and 20 and this portion is exposed so that when the knives 51 and 52 are lowered by means of the lever 48 a section of film will be cut out and the length of this section of the film will be the exact distance between the cutting edges 19 and 20. In positioning the film on the stationary bed and the movable bed, the emulsion side of the film should be the upper side. The knives are now raised by lifting the lever 48. The operator now inserts the scraper bar 60 on the guide bar 58 so that the said guide bar will extend within the guide slot 61. This brings the file member 64 into contact with the emulsion side of the film F resting on the presser plate 17. The operator now runs the scraper bar 60 back and forth so that the file member 64 files the emulsion coating from the upper side of the film until the film appears white showing that all of the emulsion has been removed. The operator then raises the scraper bar 60 from the guide bar 58 and uses the brush 73 to brush off any debris which may result from the above operation. The scraped portion of the film is best shown in Fig. 8. After the debris has been removed, a cement should be spread on the scraped surface. The operator should then grasp the manual crank 39 and rotate it from the position shown in Fig. 13 to the position shown in Fig. 15, that is, in an anti-clockwise direction as viewed in said figures. As he rotates the manual crank, the movable bed is first raised removing the centering hole 41 from the cam pin 43 and thereafter it is moved to the left as viewed in Figs. 13, 14 and 15. During the last part of the movement the movable bed is lowered so that the cam pin 43 is received in the centering hole 42 which serves as an exact positioning means. This movement of the movable bed has carried the film F from the position shown in Fig. 8 to that shown in Fig. 9 so that there is a small overlap of the two ends of the film. This overlap is over a portion of the plate 18. As the movable bed completes its movement into the position shown in Fig. 15 the presser bar 55 is moved downwardly into engagement with that portion of the film F which overlies the cement spread on the scraped portion of the film F' thereby pressing the two sections of the film into engagement with each other at the point where the cement is spread and making a neat and clean splice.

As is well known in the art, when sound film is employed the sound track 74, Fig. 8, is immediately adjacent one set of the sprocket holes. If by chance a little too much emulsion was scraped from the sound track so that after the film was repaired there was a slight portion of the sound track which had been scraped clean, thereby allowing an increased quantity of light to pass through the same, the result would be a very discordant noise. The tabs 68 are provided as a safeguard against such an eventuality, for they extend a little further than the remainder of the film F and overlie the sound track 74, thereby effectively covering up any possible error in scraping the sound track.

In splicing negative film, the amount of overlap is much less in splicing than the amount of the overlap when positive film is used. The amount of this overlap and the amount to be scraped can be effectively controlled by moving the guide bar 58 and the presser bar 55 which is rendered possible by releasing the said screws and adjusting the same to any desired position and thereafter resetting the said screws.

I realize that any changes may be made in the mechanical construction of the film splicing machine without departing from the spirit of the invention embodied therein. I have, therefore, shown my preferred construction by way of illustration in the attached drawings and in the descriptive matter relative thereto, but I desire to claim the same broadly and reserve the right to make all changes which may fairly fall within the scope of the appended claims.

Having now described my invention, I claim:

1. In a film splicer, a fixed bed and a movable bed on which torn film may be inserted, means to move the movable bed toward or away from the fixed bed and cam means to position the movable bed in either of its extreme positions.

2. In a film splicer, a fixed bed and a movable bed on which torn film may be inserted, means to cut out a precise amount of the torn film adjacent the tear, means to move the movable bed toward or away from the fixed bed and cam means to position the movable bed in either of its extreme positions.

3. As a subcombination of a film splicer, a guide bar, a scraper adapted to be moved back and forth on said guide bar so as to scrape the emulsion from the part of a film underlying the scraper, and means to adjust the scraper relative to the guide bar so as to govern the thickness of the emulsion which may be removed on the scraping operation.

4. As a subcombination of a film splicer, a guide bar provided with straight bottom and upper surfaces, the lower surface being adapted to overlie and contact a film, a scraper member adapted to receive the upper portion of the guide bar and to slide back and forth on its upper surface, the said scraper member being provided with a depending flange, a file carried by said flange and adapted to contact and scrape away the emulsion on the film, said depending flange contacting the side of said guide bar and preventing side-wise movement of said file while the flange is contacting the side of the guide bar.

5. In a film splicing machine, a movable bed and a fixed bed to which a torn film may be fastened, means to move said movable bed toward or away from said fixed bed, and a cam pin to position exactly said movable bed in either of its extreme positions.

6. In a film splicing machine, a movable bed and a fixed bed to which a torn film may be fastened, means to move said movable bed toward or away from said fixed bed, positioning means including a cam pin to position exactly said movable bed in either of its extreme positions and means to adjust said positioning means.

7. In a film splicing machine, a movable bed and a fixed bed to which a torn film may be fastened, lids for each of said beds adapted to clamp the film on the beds, means to move said movable bed toward or away from said fixed bed and adjustable cam positioning means to position precisely said movable bed in either of its extreme positions.

8. In a film splicer, a fixed bed and a movable bed on which damaged film may be placed, means to cut out the damaged part thereof, means to move the movable bed toward the fixed bed after the damaged part of the film has been removed and to press the end of the film carried by the movable bed into overlapping engagement with the end of the film carried by the fixed bed, said moving means including a manually operatable crank handle, a shaft on which said crank handle is mounted, a crank on said shaft, a crank pin carried by said crank, a slotted bar carried by said movable bed, the crank projecting into the slot of said bar and serving as a means to move said bar and movable bed toward or away from said fixed bed.

9. As a subcombination of a film splicer, a guide bar, a fixed bed, a hinged lid carried by said bed, said hinged lid supporting said guide bar, said hinged lid serving as a means to clamp film on said bed, a scraper slidable on said bar and adapted to be reciprocated to scrape emulsion from said film and means whereby the guide bar may be adjusted relative to the fixed bed.

10. As a subcombination of a film splicer, a fixed bed on which a film may be clamped, a plate provided with a cutting edge, said plate lying in the plane with said bed, the film extending over said bed and plate, means to sever said film at said cutting edge so that said film after being cut extends over said bed and plate, a clamp carried by said bed and adapted to clamp the film thereto, a guide bar carried by said clamp, a scraper slidable on said bar so that as said scraper is reciprocated it will scrape off a predetermined width of emulsion from the film and means to adjust the guide bar relative to the clamp so as to bring it closer to or further away from the cutting edge so as to vary the width of the area which may be scraped.

11. In a film splicer, a fixed bed and a movable bed on which damaged film may be placed, a fixed cutting member provided with two upstanding arms extending to the same plane as the top of the fixed bed, a movable cutter adapted to cut out the damaged film between said arms, said movable bed being positioned closely adjacent one of said arms when it is positioned so that said cutter can be operated, means to move said movable bed vertically so as to clear said arm, then laterally over said arm and then substantially vertically so that said arm will project into a slot in said movable bed and means carried by said movable bed to press the end of the film on the movable bed in overlapping position on the film on the fixed bed.

12. As a subcombination of a film splicer, a presser plate, an arm parallel to and spaced from the presser plate, a movable bed on which damaged film may be placed and carrying a pressing plate, the movable bed lying closely adjacent the arm when in one position and being provided with a slot into which the arm projects when the movable bed is in a second position and means to move the bed from its first to its second position by first raising it vertically so as to clear said arm, then laterally over said arm and then vertically so as to lower said bed with the arm projecting into said slot and so that the pressing plate will press the film towards the presser plate.

13. As a subcombination of a film splicer, a movable bed, a crank, means operated by said crank to lift said bed vertically then shift it laterally and then lower said bed vertically.

JACOB BAZELL.